US007233802B2

(12) United States Patent
Comer et al.

(10) Patent No.: US 7,233,802 B2
(45) Date of Patent: *Jun. 19, 2007

(54) INTERCONNECT SYSTEM AND METHOD FOR MULTIPLE PROTOCOL SHORT MESSAGE SERVICES

(75) Inventors: Edward I. Comer, Brevard, NC (US); Jere Sandidge, Stone Mountain, GA (US)

(73) Assignee: Cellemetry, LLC, Atlanta, GA (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/952,710

(22) Filed: Sep. 29, 2004

(65) Prior Publication Data

US 2005/0101317 A1 May 12, 2005

Related U.S. Application Data

(63) Continuation of application No. 09/669,312, filed on Oct. 27, 2000, now Pat. No. 6,856,808.

(60) Provisional application No. 60/162,413, filed on Oct. 29, 1999.

(51) Int. Cl.
*H04Q 7/20* (2006.01)
*H04Q 7/38* (2006.01)

(52) U.S. Cl. ............... 455/466; 455/422.1; 455/403; 455/414.1; 455/426.1; 455/412.1; 455/414.4; 370/345; 370/349; 370/328

(58) Field of Classification Search ............ 455/466, 455/422.1, 426.1, 426.2, 433, 445, 550.1, 455/552.1, 560, 414.1, 517, 458, 412.1, 417, 455/415, 412.2, 414.4; 370/403, 349, 436
See application file for complete search history.

(56) References Cited

U.S. PATENT DOCUMENTS

| 3,581,019 | A | 5/1971 | Ryan |
| 3,886,515 | A | 5/1975 | Cottin et al. |
| 3,973,200 | A | 8/1976 | Akerberg |
| 4,172,969 | A | 10/1979 | Levine et al. |
| 4,219,698 | A | 8/1980 | Birilli et al. |
| 4,263,480 | A | 4/1981 | Levine |

(Continued)

FOREIGN PATENT DOCUMENTS

EP          0 123 456 A2     10/1984

(Continued)

OTHER PUBLICATIONS

EIT/TIA IS-54-B Standard; p. 115 and pp. 215-222.

(Continued)

*Primary Examiner*—Keith Ferguson
(74) *Attorney, Agent, or Firm*—King & Spalding

(57) ABSTRACT

A customer central location (CCL) communicates with multiple remote wireless devices employing mutually incompatible data formats or short message service (SMS) protocols. A communication, from the CCL to a remote device or from a remote device to the CCL, passes through a short message arbitrator (SMA), which determines the identifying characteristic(s) of the device receiving the communication. From the identifying characteristic(s), the short message arbitrator determines the expected data format and the transmission path to the device. The SMA converts the communication into the expected data format and transmits the communication over the appropriate transmission path.

29 Claims, 4 Drawing Sheets

U.S. PATENT DOCUMENTS

| | | |
|---|---|---|
| 4,284,849 A | 8/1981 | Anderson et al. |
| 4,342,986 A | 8/1982 | Buskirk et al. |
| 4,361,730 A | 11/1982 | Barber et al. |
| 4,371,751 A | 2/1983 | Hilligoss, Jr. et al. |
| 4,454,027 A | 6/1984 | Fenton |
| 4,486,624 A | 12/1984 | Puhl et al. |
| 4,492,820 A | 1/1985 | Kennard et al. |
| 4,644,347 A | 2/1987 | Lucas et al. |
| 4,644,351 A | 2/1987 | Zabarsky et al. |
| 4,646,082 A | 2/1987 | Engel et al. |
| 4,677,653 A | 6/1987 | Weiner et al. |
| 4,724,425 A | 2/1988 | Gerhart et al. |
| 4,734,928 A | 3/1988 | Weiner et al. |
| 4,750,197 A | 6/1988 | Denekamp et al. |
| 4,766,548 A | 8/1988 | Cedrone et al. |
| 4,791,658 A | 12/1988 | Simon et al. |
| 4,807,225 A | 2/1989 | Fitch |
| 4,814,763 A | 3/1989 | Nelson et al. |
| 4,823,123 A | 4/1989 | Siwiak |
| 4,825,193 A | 4/1989 | Siwiak et al. |
| 4,825,457 A | 4/1989 | Lebowitz |
| 4,833,701 A | 5/1989 | Comroe et al. |
| 4,837,800 A | 6/1989 | Freeburg et al. |
| 4,839,917 A | 6/1989 | Oliver |
| 4,866,445 A | 9/1989 | Valero et al. |
| 4,868,560 A | 9/1989 | Oliwa et al. |
| 4,868,859 A | 9/1989 | Sheffer |
| 4,875,038 A | 10/1989 | Siwiak et al. |
| 4,875,230 A | 10/1989 | Blair |
| 4,882,579 A | 11/1989 | Siwiak |
| 4,887,290 A | 12/1989 | Dop et al. |
| 4,887,291 A | 12/1989 | Stillwell |
| 4,890,315 A | 12/1989 | Bendixen et al. |
| 4,891,637 A | 1/1990 | Siwiak et al. |
| 4,891,638 A | 1/1990 | Davis |
| 4,901,340 A | 2/1990 | Parker et al. |
| 4,905,234 A | 2/1990 | Childress et al. |
| 4,914,651 A | 4/1990 | Lusignan |
| 4,928,096 A | 5/1990 | Leonardo et al. |
| 4,940,963 A | 7/1990 | Gutman et al. |
| 4,972,460 A | 11/1990 | Sasuta |
| 4,979,169 A | 12/1990 | Almond et al. |
| 4,993,059 A | 2/1991 | Smith et al. |
| 5,005,014 A | 4/1991 | Jasinski |
| 5,010,584 A | 4/1991 | Seki |
| 5,020,091 A | 5/1991 | Krolopp et al. |
| 5,020,093 A | 5/1991 | Pireh |
| 5,027,383 A | 6/1991 | Sheffer |
| 5,031,204 A | 7/1991 | McKernan |
| 5,047,763 A | 9/1991 | Kuznicki et al. |
| 5,073,919 A | 12/1991 | Hagensick |
| 5,081,667 A | 1/1992 | Drori et al. |
| 5,087,919 A | 2/1992 | Odagawa et al. |
| 5,090,051 A | 2/1992 | Muppidi et al. |
| 5,117,449 A | 5/1992 | Metroka et al. |
| 5,121,503 A | 6/1992 | Davis |
| 5,124,697 A | 6/1992 | Moore |
| 5,131,019 A | 7/1992 | Sheffer et al. |
| 5,134,644 A | 7/1992 | Garton et al. |
| 5,142,279 A | 8/1992 | Jasinski et al. |
| 5,148,473 A | 9/1992 | Freeland et al. |
| 5,153,582 A | 10/1992 | Davis |
| 5,153,902 A | 10/1992 | Buhl et al. |
| 5,153,903 A | 10/1992 | Eastmond et al. |
| 5,159,625 A | 10/1992 | Zicker |
| 5,162,790 A | 11/1992 | Jasinski |
| 5,173,933 A | 12/1992 | Jabs et al. |
| 5,175,758 A | 12/1992 | Levanto et al. |
| 5,185,779 A | 2/1993 | Dop et al. |
| 5,196,842 A | 3/1993 | Gomez et al. |
| 5,206,855 A | 4/1993 | Schwendeman et al. |
| 5,208,756 A | 5/1993 | Song |
| 5,210,787 A | 5/1993 | Hayes et al. |
| 5,218,367 A | 6/1993 | Sheffer et al. |
| 5,220,599 A | 6/1993 | Sasano et al. |
| 5,222,123 A | 6/1993 | Brown et al. |
| 5,230,081 A | 7/1993 | Yamada et al. |
| 5,239,294 A | 8/1993 | Flanders et al. |
| 5,239,678 A | 8/1993 | Grube et al. |
| 5,247,567 A | 9/1993 | Hirano |
| 5,254,986 A | 10/1993 | DeLuca |
| 5,255,307 A | 10/1993 | Mizikovsky |
| 5,265,150 A | 11/1993 | Helmkamp et al. |
| 5,278,539 A | 1/1994 | Lauterbach et al. |
| 5,278,890 A | 1/1994 | Beeson, Jr. et al. |
| 5,305,217 A | 4/1994 | Nakamura et al. |
| 5,307,399 A | 4/1994 | Dai et al. |
| 5,307,509 A | 4/1994 | Michalon et al. |
| 5,335,278 A | 8/1994 | Matchett et al. |
| 5,341,410 A | 8/1994 | Aron et al. |
| 5,363,427 A | 11/1994 | Ekstrom et al. |
| 5,365,573 A | 11/1994 | Sakamoto et al. |
| 5,369,681 A | 11/1994 | Boudreau et al. |
| 5,371,781 A | 12/1994 | Ardon |
| 5,371,898 A | 12/1994 | Grube et al. |
| 5,382,970 A | 1/1995 | Kiefl |
| 5,386,209 A | 1/1995 | Thomas |
| 5,396,537 A | 3/1995 | Schwendeman |
| 5,396,539 A | 3/1995 | Slekys et al. |
| 5,398,277 A | 3/1995 | Martin, Jr. et al. |
| 5,404,392 A | 4/1995 | Miller et al. |
| 5,432,841 A | 7/1995 | Rimer |
| 5,450,329 A | 9/1995 | Tanner |
| 5,454,027 A | 9/1995 | Kennedy et al. |
| 5,493,722 A | 2/1996 | Gunn et al. |
| 5,502,761 A | 3/1996 | Duncan et al. |
| 5,511,072 A | 4/1996 | Delprat |
| 5,511,110 A | 4/1996 | Drucker |
| 5,517,547 A | 5/1996 | Ladha et al. |
| 5,519,756 A | 5/1996 | Clift |
| 5,526,401 A | 6/1996 | Roach, Jr. et al. |
| 5,528,664 A | 6/1996 | Slekys et al. |
| 5,530,736 A | 6/1996 | Comer et al. |
| 5,533,094 A | 7/1996 | Sanmugam |
| 5,539,810 A | 7/1996 | Kennedy, III et al. |
| 5,544,223 A | 8/1996 | Robbins et al. |
| 5,544,225 A | 8/1996 | Kennedy, III et al. |
| 5,546,444 A | 8/1996 | Roach, Jr. et al. |
| 5,574,975 A | 11/1996 | Hill |
| 5,579,372 A | 11/1996 | Åström |
| 5,586,177 A | 12/1996 | Farris et al. |
| 5,594,740 A | 1/1997 | LaDue |
| 5,594,945 A | 1/1997 | Lewis et al. |
| 5,596,573 A | 1/1997 | Bertland |
| 5,603,091 A | 2/1997 | Linquist et al. |
| 5,610,973 A | 3/1997 | Comer |
| 5,619,209 A | 4/1997 | Horstein et al. |
| 5,625,889 A | 4/1997 | Chikkaswamy et al. |
| 5,629,975 A | 5/1997 | Tiedemann, Jr. et al. |
| 5,640,139 A | 6/1997 | Egeberg |
| 5,648,966 A | 7/1997 | Kondo et al. |
| 5,652,570 A | 7/1997 | Lepkofker |
| 5,675,371 A | 10/1997 | Barringer |
| 5,678,179 A | 10/1997 | Turcotte et al. |
| 5,680,551 A | 10/1997 | Martino, II |
| 5,684,858 A | 11/1997 | Hartmann et al. |
| 5,686,888 A | 11/1997 | Welles, II et al. |
| 5,701,302 A | 12/1997 | Geiger |
| 5,722,067 A | 2/1998 | Fougnies et al. |
| 5,742,668 A | 4/1998 | Pepe et al. |
| 5,742,905 A | 4/1998 | Pepe et al. |
| 5,745,867 A | 4/1998 | Mills |
| 5,748,104 A | 5/1998 | Argyroudis et al. |
| 5,751,789 A | 5/1998 | Farris et al. |

| | | | | | | |
|---|---|---|---|---|---|---|
| 5,754,954 | A | 5/1998 | Cannon et al. | 6,175,732 | B1 | 1/2001 | McDaniel et al. |
| 5,758,313 | A | 5/1998 | Shah et al. | 6,185,198 | B1 | 2/2001 | LaDue |
| 5,761,621 | A | 6/1998 | Sainton | 6,195,546 | B1 | 2/2001 | Leung et al. |
| 5,767,788 | A | 6/1998 | Ness | 6,215,404 | B1 | 4/2001 | Morales |
| 5,768,343 | A | 6/1998 | Dame et al. | 6,233,450 | B1 | 5/2001 | Seppanen |
| 5,777,605 | A | 7/1998 | Yoshinobu et al. | 6,236,357 | B1 | 5/2001 | Corwith |
| 5,781,612 | A | 7/1998 | Choi et al. | 6,249,217 | B1 | 6/2001 | Forbes ........................ 340/426 |
| 5,787,149 | A | 7/1998 | Yousefi et al. | 6,259,781 | B1 | 7/2001 | Crouch et al. ............... 379/207 |
| 5,787,357 | A | 7/1998 | Salin | 6,263,212 | B1 | 7/2001 | Ross et al. |
| 5,790,631 | A | 8/1998 | Minarczik et al. | 6,282,496 | B1 | 8/2001 | Chowdhary |
| 5,794,144 | A | 8/1998 | Comer et al. | 6,285,868 | B1 | 9/2001 | LaDue |
| 5,797,097 | A | 8/1998 | Roach, Jr. et al. | 6,285,953 | B1 | 9/2001 | Harrison et al. |
| 5,805,997 | A | 9/1998 | Farris | 6,292,669 | B1 | 9/2001 | Meuronen et al. |
| 5,819,184 | A | 10/1998 | Cashman | 6,297,768 | B1 | 10/2001 | Allen, Jr. |
| 5,822,221 | A | 10/1998 | Groenteman | 6,298,232 | B1 | 10/2001 | Marin et al. ................. 455/413 |
| 5,822,423 | A | 10/1998 | Jehnert et al. | 6,311,056 | B1 | 10/2001 | Sandidge |
| 5,826,195 | A | 10/1998 | Westerlage et al. | 6,311,060 | B1 | 10/2001 | Evans et al. |
| 5,845,203 | A | 12/1998 | LaDue | 6,330,452 | B1 | 12/2001 | Fattouche et al. |
| 5,845,211 | A | 12/1998 | Roach, Jr. | 6,353,743 | B1 | 3/2002 | Karmel |
| 5,862,201 | A | 1/1999 | Sands | 6,353,745 | B1 | 3/2002 | Wehrend et al. ............. 455/466 |
| 5,862,480 | A | 1/1999 | Wild et al. | 6,363,249 | B1 | 3/2002 | Nordeman et al. ......... 455/418 |
| 5,862,481 | A | 1/1999 | Kulkarni et al. | 6,363,254 | B1 | 3/2002 | Jones et al. |
| 5,873,043 | A | 2/1999 | Comer | 6,363,324 | B1 | 3/2002 | Hildebrant |
| 5,875,863 | A | 3/1999 | Jarvis et al. | 6,369,719 | B1 | 4/2002 | Tracy et al. |
| 5,878,351 | A | 3/1999 | Alanara et al. | 6,370,135 | B1 | 4/2002 | Gardner |
| 5,884,216 | A | 3/1999 | Shah et al. | 6,377,210 | B1 | 4/2002 | Moore |
| 5,889,474 | A | 3/1999 | LaDue | 6,389,289 | B1 | 5/2002 | Voce et al. |
| 5,898,917 | A | 4/1999 | Batni et al. | 6,393,295 | B1 | 5/2002 | Butler et al. |
| 5,901,142 | A | 5/1999 | Averbuch et al. | 6,397,056 | B1 | 5/2002 | Bugnon et al. |
| 5,909,651 | A | 6/1999 | Chander et al. | 6,405,033 | B1 | 6/2002 | Kennedy, III et al. |
| 5,913,166 | A | 6/1999 | Buttitta et al. | 6,424,828 | B1* | 7/2002 | Collins et al. ........... 455/412.1 |
| 5,917,449 | A | 6/1999 | Sanderford et al. | 6,424,841 | B1 | 7/2002 | Gustafsson |
| 5,917,886 | A | 6/1999 | Halkio | 6,457,038 | B1 | 9/2002 | Defosse |
| 5,918,172 | A | 6/1999 | Saunders et al. | 6,476,763 | B2 | 11/2002 | Allen |
| 5,920,822 | A | 7/1999 | Houde et al. | 6,484,035 | B2 | 11/2002 | Allen |
| 5,924,026 | A | 7/1999 | Krishnan | 6,487,602 | B1 | 11/2002 | Thakker ...................... 709/230 |
| 5,933,784 | A | 8/1999 | Gallagher et al. .......... 455/552 | 6,493,556 | B1 | 12/2002 | Stinson ....................... 455/445 |
| 5,946,629 | A | 8/1999 | Sawyer et al. | 6,493,558 | B1 | 12/2002 | Bernhart et al. ............ 455/466 |
| 5,946,630 | A | 8/1999 | Willars et al. | 6,515,997 | B1 | 2/2003 | Feltner et al. ............... 370/401 |
| 5,999,808 | A | 12/1999 | LaDue | 6,560,456 | B1 | 5/2003 | Lohtia et al. ............... 455/445 |
| 6,012,013 | A | 1/2000 | McBurney | 6,570,532 | B2 | 5/2003 | Mise et al. |
| 6,012,014 | A | 1/2000 | Koyanagi et al. | 6,618,671 | B2 | 9/2003 | Dooley et al. |
| 6,014,089 | A | 1/2000 | Tracy et al. | 6,622,016 | B1 | 9/2003 | Sladek et al. ............... 455/414 |
| 6,018,657 | A | 1/2000 | Kennedy, III et al. | 6,625,461 | B1 | 9/2003 | Bertacchi .................... 455/466 |
| 6,025,774 | A | 2/2000 | Forbes ........................ 340/426 | 6,710,738 | B2 | 3/2004 | Allen |
| 6,026,345 | A | 2/2000 | Shah et al. | 6,714,793 | B1 | 3/2004 | Carey et al. ................ 455/466 |
| 6,049,273 | A | 4/2000 | Hess | 6,718,177 | B1 | 4/2004 | Comer et al. |
| 6,067,454 | A | 5/2000 | Foti ............................. 455/433 | 6,718,237 | B1 | 4/2004 | Murray et al. |
| 6,070,070 | A | 5/2000 | Ladue | 6,738,647 | B1 | 5/2004 | Link, II |
| 6,072,862 | A * | 6/2000 | Srinivasan ............. 379/100.08 | 6,741,853 | B1 | 5/2004 | Jiang et al. ................. 455/418 |
| 6,078,811 | A | 6/2000 | Lin et al. .................... 455/433 | 6,745,041 | B2 | 6/2004 | Allison et al. .............. 455/466 |
| 6,078,820 | A | 6/2000 | Wells et al. | 6,760,580 | B2 | 7/2004 | Robinson et al. ......... 455/412.2 |
| 6,081,514 | A | 6/2000 | Raith | 6,771,949 | B1 | 8/2004 | Corliss ........................ 455/413 |
| 6,081,546 | A | 6/2000 | Williamson et al. | 6,782,276 | B1 | 8/2004 | Lam et al. ................... 455/560 |
| 6,088,431 | A | 7/2000 | LaDue | 6,856,808 | B1 | 2/2005 | Comer et al. |
| 6,094,578 | A | 7/2000 | Purcell et al. ............... 455/426 | 6,865,191 | B1 | 3/2005 | Bengtsson et al. .......... 370/475 |
| 6,097,951 | A | 8/2000 | Ernam et al. | 6,882,843 | B1 | 4/2005 | Comer |
| 6,108,537 | A | 8/2000 | Comer et al. | 2001/0003093 | A1 | 6/2001 | Lundin |
| 6,108,540 | A | 8/2000 | Sonti et al. | 2001/0042121 | A1 | 11/2001 | Defosse et al. |
| 6,111,539 | A | 8/2000 | Mannings et al. | 2001/0047244 | A1 | 11/2001 | Harrison et al. |
| 6,122,514 | A | 9/2000 | Spaur et al. | 2001/0047410 | A1 | 11/2001 | Defosse |
| 6,125,275 | A | 9/2000 | Comer et al. | 2001/0054083 | A1 | 12/2001 | Defosse |
| 6,138,034 | A | 10/2000 | Willey | 2002/0016829 | A1 | 2/2002 | Defosse |
| 6,144,722 | A | 11/2000 | Anderson et al. | 2002/0086636 | A1 | 7/2002 | Tracy et al. |
| 6,144,859 | A | 11/2000 | LaDue | 2002/0110230 | A1 | 8/2002 | Leuca .................... 379/201.01 |
| 6,148,202 | A | 11/2000 | Wortham | 2002/0155844 | A1 | 10/2002 | Rankin et al. |
| 6,150,955 | A | 11/2000 | Tracy et al. | 2002/0160771 | A1 | 10/2002 | Massie et al. .............. 455/426 |
| 6,151,507 | A | 11/2000 | Laiho et al. ................. 455/466 | 2002/0164988 | A1 | 11/2002 | Vishwanathan et al. .... 455/445 |
| 6,154,648 | A | 11/2000 | Comer | 2002/0194387 | A1 | 12/2002 | Defosse |
| 6,154,658 | A | 11/2000 | Caci | 2002/0196924 | A1 | 12/2002 | Dahari .................... 379/220.01 |
| 6,161,020 | A | 12/2000 | Kim | 2003/0003930 | A1 | 1/2003 | Allison et al. .............. 455/466 |
| 6,163,701 | A | 12/2000 | Saleh et al. | 2003/0009313 | A1 | 1/2003 | May et al. |
| 6,169,895 | B1 | 1/2001 | Buhrmann et al. | 2003/0021273 | A1 | 1/2003 | Fouquet et al. |

| | | | |
|---|---|---|---|
| 2003/0022656 A1 | 1/2003 | Hinnant, Jr. et al. |
| 2003/0054830 A1 | 3/2003 | Williams et al. |
| 2003/0097474 A1 | 5/2003 | Defosse |
| 2003/0101257 A1 | 5/2003 | Godwin |
| 2003/0101262 A1 | 5/2003 | Godwin |
| 2003/0119498 A1 | 6/2003 | Haas et al. ............... 455/426 |
| 2003/0129969 A1 | 7/2003 | Rucinski .................. 455/412 |
| 2003/0204391 A1 | 10/2003 | May et al. |
| 2004/0029598 A1 | 2/2004 | Guggisberg ............. 455/466 |
| 2004/0110493 A1 | 6/2004 | Alvarez et al. ......... 455/414.1 |
| 2004/0142707 A1 | 7/2004 | Midkiff et al. .......... 455/466 |
| 2004/0180678 A1 | 9/2004 | Smith et al. ............. 455/466 |
| 2004/0203640 A1 | 10/2004 | Molander et al. ....... 455/414.1 |
| 2005/0037784 A1 | 2/2005 | Cleary .................... 455/466 |

FOREIGN PATENT DOCUMENTS

| | | |
|---|---|---|
| EP | 0 123 562 B1 | 7/1990 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |
| WO | WO 95/25407 A1 | 9/1995 |
| WO | WO 95/26088 A1 | 9/1995 |
| WO | WO 96/03007 A1 | 2/1996 |
| WO | WO 96/10895 A1 | 4/1996 |
| WO | WO 96/37079 A1 | 11/1996 |
| WO | WO 96/38989 A1 | 12/1996 |
| WO | WO 97/36435 A1 | 10/1997 |
| WO | WO 97/38540 A1 | 10/1997 |
| WO | WO 97/45991 A2 | 12/1997 |
| WO | WO 98/06227 A2 | 2/1998 |
| WO | WO/98/19438 A1 | 5/1998 |
| WO | WO 98/19447 A1 | 5/1998 |
| WO | WO 98/27780 A2 | 6/1998 |
| WO | WO 99/26428 A1 | 5/1999 |
| WO | WO 99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 2006/014419 A1 | 11/2002 |
| WO | WO 03/19925 A2 | 3/2003 |
| WO | WO 2005/074430 | 8/2005 |

OTHER PUBLICATIONS

European Telecommunications Standards Institute: *European Digital Cellular Telecommunications System (Phase 2): Technical Realization of the Short Message Service (SMS) Point to Point (PP) (GSM 03.40)*; European Telecommunications Standard; Oct. 1993; Draft pr ETS 300 536; pp. 1-103.

European Telecommunications Standards Institute: *European Digital Cellular Telecommunications System (Phase 2): Technical Realization of the Short Message Service Call Broadcast(SMSCB) (GSM 03.41)*; European Telecommunications Standard; Oct. 1993; Draft pr ETS 300 537; pp. 1-24.

funSMS.net; *SMS Tutorial*; pp. 1-17; http://www.funsms.net/sms_tutorial.htm.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

\* cited by examiner

INTERCONNECT SYSTEM AND METHOD FOR MULTIPLE PROTOCOL SHORT MESSAGE SERVICES

RELATED APPLICATIONS

This application is a continuation of and claims priority to U.S. patent application Ser. No. 09/699,312, filed Oct. 27, 2000 now U.S. Pat. No. 6,856,808 and entitled "Interconnect System and Method for Multiple Protocol Short Message Services," which claims priority to U.S. Provisional Patent Application No. 60/162,413, filed Oct. 29, 1999 and having the same title. The content of both of these applications is hereby fully incorporated herein by reference.

FIELD OF THE INVENTION

The present invention relates to the exchange of short messages between a central location and a remote location, and more particularly to identifying the recipient of each short message, identifying the data format expected by the recipient of the short message and converting the received short message to the identified data format.

BACKGROUND OF THE INVENTION

Short Message Service (SMS) is an inherent capability of most digital wireless telecommunications systems. The radio technologies associated with each of the digital wireless telecommunications system's are technically incompatible at the radio signal layer, but most are compatible at the intersystem SS7 transport layer. Currently, the differing RF technologies, e.g., time division multiple access (TDMA), code division multiple access (CDMA), and global system for mobile telecommunications (GSM), have at least partial technical compatibility over the IS41 industry standard that is currently carried over the telephone industry's SS7 internetworking system. The partial compatibility of these RF technologies is possible because the basic transport format is specified in the IS41 standard; however, many of the messaging details are implementation specific.

Even though it is possible for current short message service center platforms (SMSC) to support all of these multiple protocols, typically, an installed SMSC only supports the protocol of the cellular telecommunication system into which it is installed. For example, if the SMSC is installed into an IS136 type TDMA system, the SMSC supports only the TDMA protocol. Similarly, if the SMSC is installed into a GSM system, then the SMSC supports only the GSM protocol. In other words, although most current SMSC's can interface with any of the currently popular digital cellular systems, the SMSC's do so on an individual basis, not all simultaneously.

For example, in one network, the nodes communicate using different data formatting standards, such as integrated services digital network (ISDN) and the Japanese X.50 standard. Each of the nodes is connected to a format converter. The format converter acts as a bi-directional converter for converting between two data formats and thus allows communication between the two nodes.

The format converter reformats the data formatted in the X.50 standard into the ISDN format. The format converter accomplishes the conversion by storing the incoming X.50 data in an aligned data RAM with offsets, to provide an appropriate alignment among the frames of the data. Then, a format conversion module reformats the data into the ISDN format one byte at a time.

In another network, a subscriber in an electronic messaging network can access messages in a variety of formats. A subscriber may receive messages through a variety of types of equipment, such as a voice mail system, an e-mail system, a facsimile machine and a telephone, all connected to a wireline network. The subscriber may access these messages through a pager, a cellular telephone, or a personal digital assistant, each connected to a different wireless network. The subscriber selects the wireline or wireless network and media format to be used for delivering messages or notifying a subscriber that a message has been received.

For example, the subscriber may elect to have notification of a voice mail or facsimile receipt directed to the personal digital assistant (PDA) in the form of an e-mail message. In accordance with the method of the network, the subscriber's selection is implemented through the personal intercommunications inter-networking system, which performs the appropriate data conversion from one protocol to another and delivers the e-mail message.

In yet another network, an intelligent signaling transfer point (ISTP) is included in a telephone network with a database for storing call processing control information. Calls from one station on the network to another are either passed through or intercepted at the ISTP and screened in accordance with criteria stored in the database, such as time of day, a certain originating area or caller, or a specified call count value.

In still another network, a data collection device is provided for use with any one of the following: TDMA; CDMA; frequency division multiple access (FDMA); GSM; and personal access communications systems (PACS) technologies. But, the data collection device does not use multiple such technologies in a single system.

Thus, there is a need for a system in which a central location can communicate with several remote stations, which use different digital cellular or personal communications system (PCS) formats. The systems and methods discussed above only teach conversion between two specific formats.

SUMMARY OF THE INVENTION

The present invention meets the needs described above by providing a system and method for interconnecting digital cellular systems of multiple formats so that a customer central location (CCL) can send short messages to, or receive short messages from, multiple remote locations using different digital cellular or PCS standards. A short message arbitrator (SMA) intercepts a communication from the CCL to a remote location. The SMA retrieves information sent with the communication, such as the mobile identification number (MIN) or other identifying characteristic. The SMA uses the identifying characteristic to determine the mobile switching center (MSC) serving the remote location, the wireless access method used in the MSC's market, the CCL's class of service and the type of transport to be used between the SMA and the MSC. Based on the information retrieved from the database, the SMA determines whether the communication needs to be converted. If the communication needs to be converted, then the SMA converts the communication to the format expected by the remote device and sends the communication over the appropriate transmission path.

The SMA also intercepts a communication from a remote location to the CCL. The SMA retrieves information sent with the communication, such as the MIN and MSC identifier, or other identifying characteristic. The SMA uses the identifying characteristic to determine the recipient of the communication, in this case the CCL, and the class of service expected by the recipient. The SMA also uses the information stored in the database to determine whether the communication should be converted. If the communication should be converted, then the SMA performs the conversion and sends the communication to the CCL.

Therefore, it is an object of the present invention to provide a system and method for interconnecting multiple remote locations over multiple wireless (e.g., digital cellular and PCS) systems using multiple, otherwise incompatible protocols.

It is another object of the invention to provide a system and method for allowing a CCL to exchange short messages with such remote locations.

It is a further object of the invention to provide such a system and method using a single SMA which can determine the data format or short message system (SMS) protocol expected by the recipient (CCL or remote location), thereby avoiding the need for a separate bi-directional translator for every possible communication path.

It is still a further object of this invention to provide a method for integrating with and supporting all of the currently popular digital cellular systems, simultaneously, thus reducing deployment costs for cellular carriers.

It is yet another object of this invention to permit sending SMS messages originated in one type of cellular system to another dissimilar cellular system in a transparent manner.

DETAILED DESCRIPTION

The present invention is directed to a system and method for interconnecting digital cellular systems of multiple formats so that a customer central location (CCL) can send short messages to, or receive short messages from, multiple remote locations using different digital cellular or PCS standards. Briefly described, a short message arbitrator (SMA) intercepts a communication between the CCL and the remote locations. The SMA retrieves information sent with the communication, such as the mobile identification number (MIN) or other identifying characteristic. The information is used to search a database to determine the data format used by the sender and expected by the recipient. Based upon the information retrieved from the database, the SMA determines whether the communication should be converted. If the communication should be converted, then the SMA converts the communication and transmits the communication to the intended recipient over the appropriate transmission path.

Exemplary System Architecture

Figure 1:
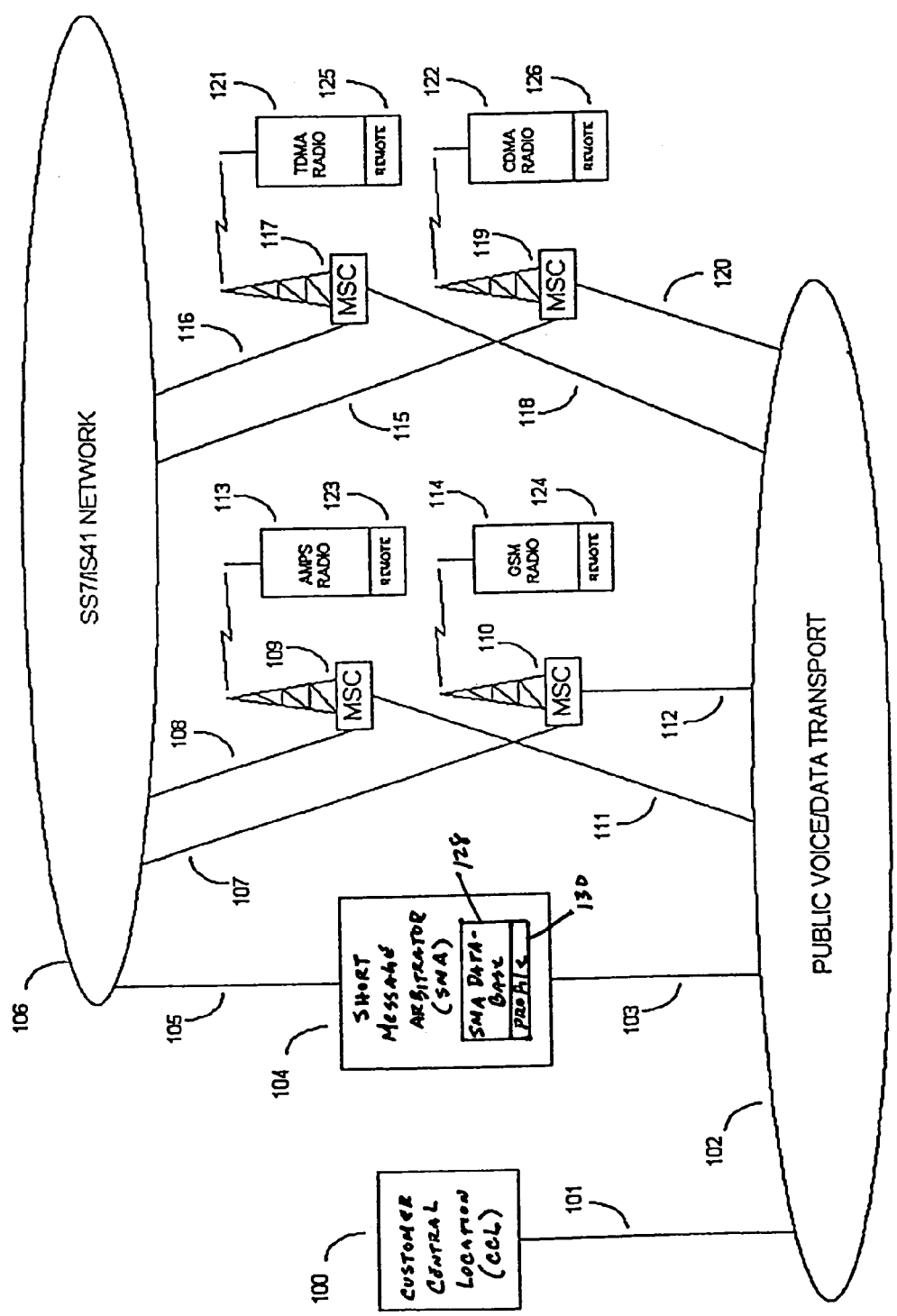
FIG. 1 is a block diagram of an interconnect system according to an exemplary embodiment of the present invention.

FIG. 1 shows an exemplary system for providing a flexible bi-directional data transport between a CCL 100 and one or more remote locations using wireless technologies.

The CCL 100 sends and receives data to and from remote locations 123, 124, 125 and 126. Data from the CCL 100 is transferred to the SMA 104 using a public voice/data transport 102 over data circuits 101 and 103.

The SMA 104 converts the CCL's data to the proper format for transport to MSC's 109, 110, 117 and 119. The SMA 104 utilizes two routes for delivering the CCL's data to MSC's 109, 110, 117, and 119. The SMA 104 routes the CCL's data to one of the MSC's 109, 110, 117, and 119 by: 1) using a data circuit 105 to an SS7/IS41 Network 106, then over a data circuit (107, 108, 115 or 116) to the MSC (109, 110, 117, or 119) that is intended to receive the transmitted data; or 2) using a data circuit 103 back to the public voice/data transport 102, then over a data circuit (111, 112, 118, or 120) to the MSC (109, 110, 117, or 119) that is intended to receive the transmitted data.

Depending on the wireless access method used at the remote location, the CCL's data is routed to the selected wireless market. For advanced mobile phone service (AMPS) wireless communications, the data is transported from the MSC 109 to an AMPS radio 113 and finally to the remote location 123. For time division multiple access (TDMA) wireless communications, the data is transported from the MSC 117 to a TDMA radio 121 and finally to the remote location 125. For code division multiple access (CDMA) wireless communications, the data is transported from the MSC 119 to a CDMA radio 122 and finally to the remote location 126. For global system for mobile telecommunications (GSM), the data is transported from the MSC 110 to a GSM radio 114 and finally to the remote location 124.

The system of FIG. 1 provides for the bi-directional transport of data between a CCL 100 and its remote locations (123, 124, 125, or 126) using a wireless link (Cellular or PCS). The CCL 100 can use one or more methods to deliver data to the SMA 104. The various methods employ a variety of communication system components. Below are four examples:

1) a dial-up data connection via a voice circuit 101 to the public voice/data transport 102 (public switched telephone network), then over the voice circuit 103;

2) a dial-up or dedicated data circuit 101 to the public voice/data transport 102 (Internet) then over the data circuit 103;

3) a dedicated data circuit 101 to public voice/data transport 102 (frame-relay private network) then over the data circuit 103; and 4) an ISDN circuit 101 to public voice/data transport 102 (public switched telephone network), then over the ISDN circuit 103.

After the SMA 104 receives the data from the CCL 100, it uses an identifying characteristic, such as the mobile identification number (MIN) or international mobile station identifier (IMSI), that was received with the data, to retrieve the CCL's profile 130 from a SMA database 128. The SMA determines the following from the CCL profile: 1) the MSC (109, 110, 117, or 119) serving the remote radio (113, 114, 121 or 122); 2) the wireless access method used in the MSC's market; 3) the CCL's class of service; and 4) the type of transport to use between the SMA 104 and the selected MSC (109, 110, 117, or 119). Based upon the information retrieved from the database, the SMA determines whether any alterations are required to the data or identifying characteristic to make the data compatible with a technologically dissimilar receiving unit or system.

The CCL's class of service may include one of the following: "CELLEMETRY" data service; short message system (SMS); asynchronous digital data; or data over circuit switched voice cellular. "CELLEMETRY" data service is available to AMPS (analog and digital) radios, SMS and asynchronous digital data are available to digital radios (CDMA, GSM and TDMA), and circuit switched voice cellular is available in all methods of wireless access. In addition, those skilled in the art will appreciate that other classes of service may be used with the CCL 100 of the present invention.

For simplicity only one CCL 100 is illustrated in FIG. 1. However, the SMA can support multiple CCL's. Each CCL served by the SMA has a CCL identifier that is stored in the database.

Figure 2:
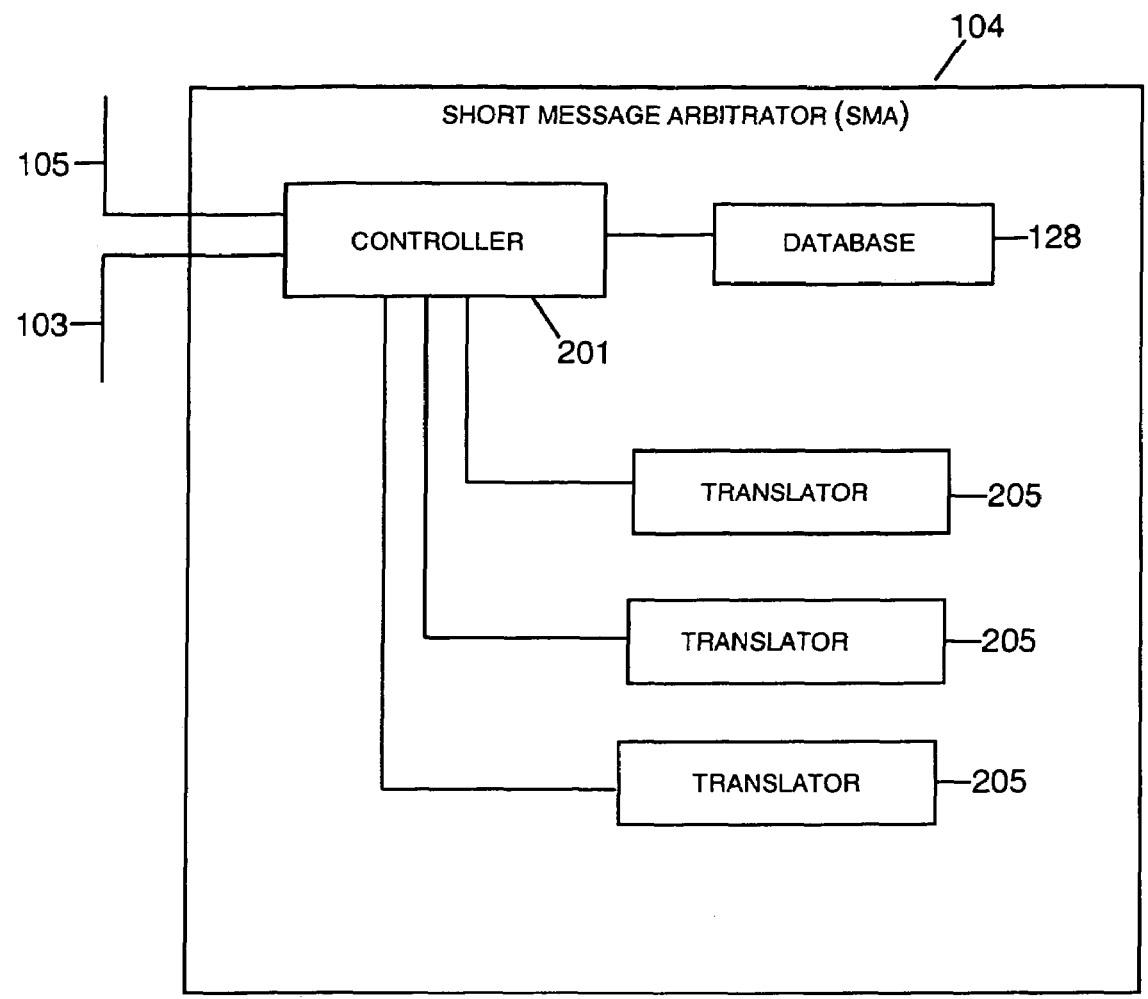
FIG. 2 is a block diagram of an exemplary short message arbitrator of the system of FIG. 1.

FIG. 2 shows an exemplary SMA 104 of the present invention. The controller 201 manages communication over the data circuits 103 and 105. The SMA database 128 (FIG. 1) stores a profile for each CCL 100 supported by the SMA 104. The profile provides information to support the conversion and transport of data between a central location, such as CCL 100, and its remote locations, such as remote locations 123, 124, 125, and 126. From the stored profiles the SMA determines the recipient of the communication, as well as the method of data transport and any data conversions that are necessary.

The SMA analyzes the information about the CCL and the remote device stored in the database to determine whether the CCL and the remote are using compatible or incompatible data formats. If the CCL and the remote are using incompatible data formats, then the SMA converts the data. As will be apparent to one skilled in the art, the conversion from one data format into another can be managed in any suitable way, e.g., through multiple bi-directional translators 205.

Exemplary Communications Methods

Figure 3:
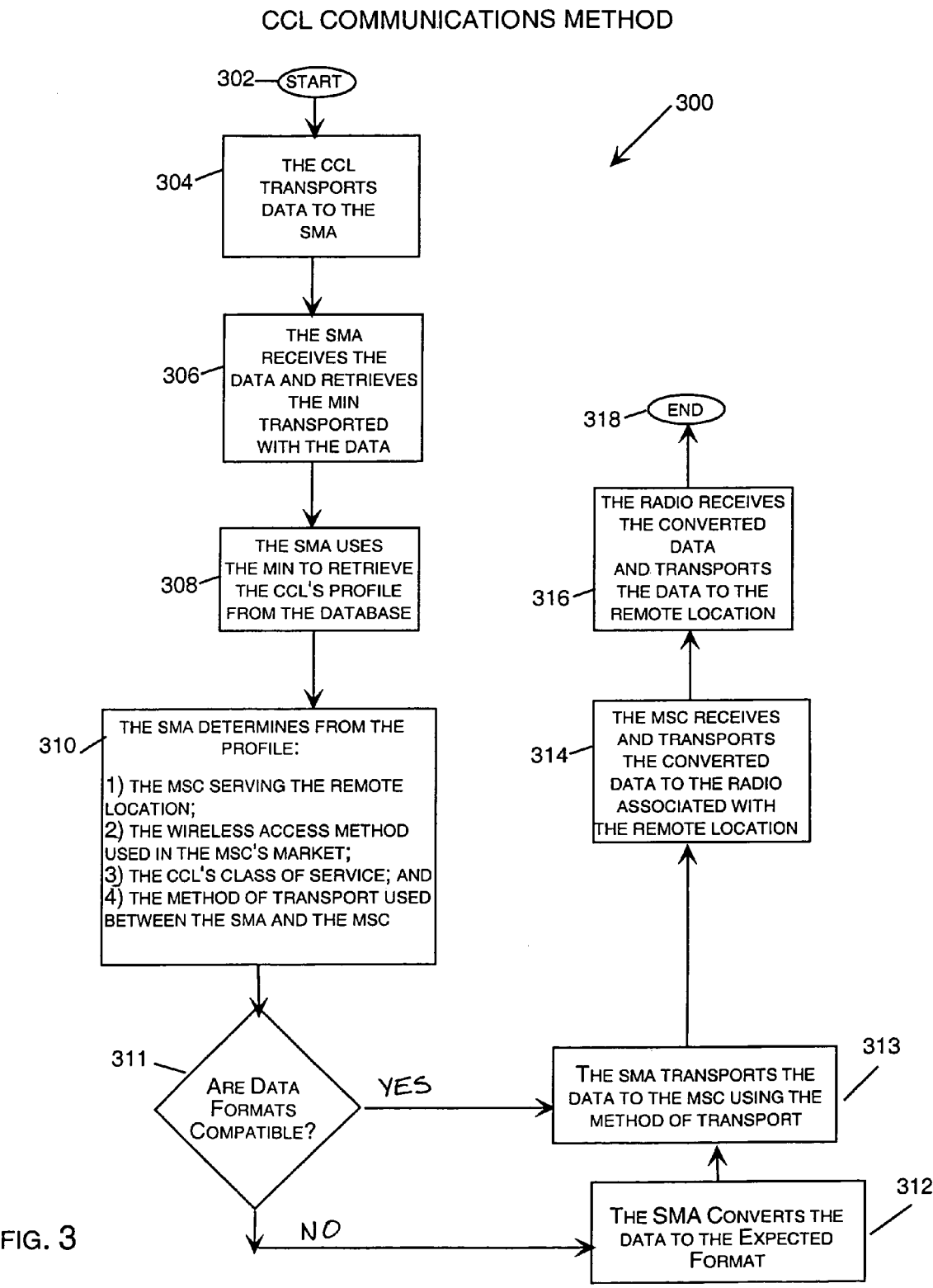
FIG. 3 is a flow diagram illustrating an exemplary communications method used by the CCL to transmit data to the remote locations.
Figure 4:
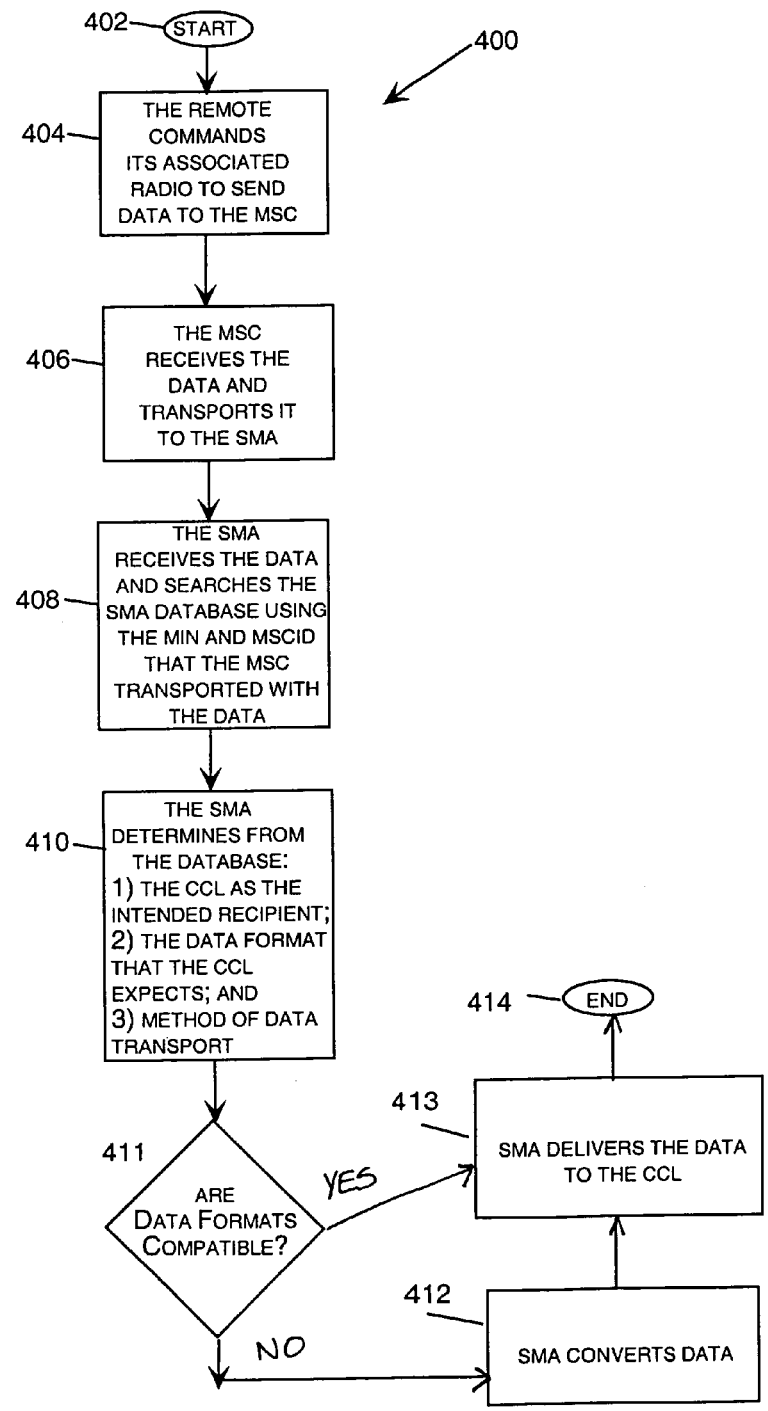
FIG. 4 is a flow diagram illustrating an exemplary communications method used by the remote locations to transmit data to the CCL.

FIG. 3 and FIG. 4 are flow diagrams illustrating exemplary communication methods of the present invention. These figures illustrate the communication methods utilized to transfer data between the customer central location (CCL) 100 and the remote locations (123, 124, 125, and 126) of FIG. 1. The communication methods of FIG. 3 and FIG. 4 allow the remote locations (123, 124, 125, and 126) and CCL 100 to communicate, even though they are connected by multiple wireless (e.g. digital cellular and PCS) systems using multiple, otherwise incompatible protocols or data formats. In discussing the following flow diagrams, reference will be made to the elements of FIG. 1.

FIG. 3 is a flow diagram illustrating the communications method 300 used by the CCL 100 to transfer data to a remote location (123, 124, 125, or 126). Communications method 300 begins at step 302 and proceeds to step 304. At step 304, the CCL 100 transports the data to SMA 104. The SMA 104 at step 306 receives the data and retrieves the MIN, or other identifying characteristic, transported with the data. At step 308, the SMA 104 uses the MIN to retrieve the CCL's profile 130 from the SMA database 128.

From the profile 130, the SMA 104 determines the MSC (109, 110, 117, or 119) that is serving the remote radio (113, 114, 121 or 122) identified by the MIN, the wireless access method or data format used in the MSC's market, the class of service or data format used by the CCL, and the method of transport to use between the SMA 104 and the selected MSC (109, 110, 117, or 119), in step 310. In step 311, the SMA determines whether the data formats used by the CCL and the remote are compatible. If the data formats are compatible, then the Yes branch is followed to step 313. However, if the data formats are not compatible, then the No branch is followed to step 312. At step 312, the SMA 104 converts the data to the proper format.

At step 313, the SMA transports the data to the appropriate MSC (109, 110, 117, or 119) using the method of transport specified in the database. Proceeding to step 314, the MSC (109, 110, 117, or 119) receives and transports the data to the radio (113, 114, 121, or 122) associated with the remote location (123, 124, 125, or 126). Communications method 300 then proceeds to step 316. At step 316, the radio (113, 114, 121, or 122) receives the converted data and transports it to the remote location (123, 124, 125, or 126). Finally, communications method 300 proceeds to step 318 and the method ends.

FIG. 4 is a flow diagram illustrating an exemplary remote communications method 400 used by the remote locations (123, 124, 125, or 126) to transfer data to the CCL 100. The remote communications method 400 illustrates the steps used by a remote location (123, 124, 125, or 126) to transport data to the CCL 100. Remote communications method 400 begins at step 402 and proceeds to step 404. At step 404, the remote location (123, 124, 125, or 126) commands its radio (113, 114, 121, or 122) to send data to its associated MSC (109, 110, 117, or 119). At step 406, the MSC (109, 110, 117, or 119) receives the data and transports it to the SMA 104.

The remote communications method 400 then proceeds to step 408. At step 408, the SMA 104 receives the data and retrieves the identifying characteristics, such as the MIN (or IMSI) and MSC identifier (MSCID), from the data. The SMA 104 searches the SMA database 128 using the MIN and MSCID that the MSC (109, 110, 117 or 119) transported with the data. Next, at step 410, the SMA 104 determines from the SMA database 128: 1) the CCL identifier; 2) the class of service used by the identified CCL 100; and 3) the wireless access method used by the MSC.

The SMA compares the class of service used by the CCL and the wireless access method used by the MSC to determine whether the data formats are compatible in step 411. If the data formats are compatible, then the Yes branch is followed to step 413. However, if the data formats are incompatible, then the No branch is followed to step 412 and the data is converted. Once the data is converted, the method proceeds to step 413. In step 413, the SMA delivers the data to the CCL. The SMA delivers the data to the CCL using a transmission path that is appropriate for the CCL identified by the CCL identifier. Then, remote communications method 400 proceeds to step 414 and ends.

Exemplary Communications

The following examples are exemplary communications supported by the present invention. These examples are intended to illustrate some of the possible communication schemes, between the CCL 100 and the remote locations (123, 124, 125, and 126), that may be implemented with the present invention. These examples are in no way intended to limit the scope of the invention. Those skilled in the art will appreciate that there are many other possible schemes and protocols that may be implemented with the present invention.

In a first example, the CCL 100 sends data to the remote location 123. The remote location 123 is associated with an AMP's radio 113 and the AMP's radio is served by MSC 109. The CCL's class of service is "CELLEMETRY" Data Service. The CCL 100 sends the MIN of the AMPS radio 113 along with the data to be transported to the SMA 104. The SMA 104 determines from the SMA database 128 that the MIN corresponds to the AMP's radio 113; the class of service is "CELLEMETRY" Data Service; and the MSC 109 serves the radio 113.

Depending on the type of mobile switching center, either an IS41 inter system page message is sent from the SMA 104 to the MSC 109 through data circuit 105, the SS7/IS41 network 106 and the data circuit 108; or a roamer-access call is made from the SMA 104 to the MSC 109 through circuit 103, public voice/data transport 102 and the data circuit 111. The SMA determines the appropriate method of transport between the SMA 104 and the MSC 109 from the database 128. The MSC 109 then broadcasts a page order, which is received by the AMPS radio 113 and delivered to the remote location 123 to complete the transaction.

In another example, the remote location 123 sends data to the CCL 100. The remote location 123 is associated with the AMP's radio 113 and the AMP's radio is served by MSC 109. The remote location 123 sends a message to the CCL 100 by commanding the AMPS radio 113 to generate a regeneration notification that is received by the MSC 109. The MSC 109 then forwards the regeneration notification to the SMA 104, via the data circuit 108, the SS7/IS41 network 106 and the data circuit 105. Once the SMA 104 receives the notification, the SMA 104 searches the SMA database 128, using the MIN and the MSCID provided by the MSC 109. From the database 128, the SMA 104 determines the following: 1) the CCL identifier for the intended recipient; 2) the class of service used by the CCL; and 3) and the wireless access method used by MSC 109. The SMA 104 compares the class of service used by the CCL 100 and the wireless access method used by MSC 109 to determine whether the data needs to be converted. If so, the SMA 104 converts the data. The data is delivered to the CCL 100 using the data circuit 103, public voice/data transport 102 and the data circuit 101.

In a further example, the CCL 100 sends data to the remote location 125. The remote location 125 is associated with a TDMA radio 121 and the TDMA radio is served by MSC 117. The CCL 100 sends the MIN of the TDMA radio 121 along with the data to the SMA 104. The SMA 104 determines from the SMA database 128 that the MIN corresponds to the TDMA radio 121; short message system (SMS) is the class of service; the MSC 117 serves the radio 121, and the method of transport between the SMA and the MSC 117. In this example, the method of transport is via data circuit 105 and SS7/IS41 network 106. Once this information is retrieved, the SMA 104 sends an IS41 SMS message to the MSC 117 through data circuit 105, the SS7/IS41 network 106, and data circuit 116. Then, MSC 117 sends a SMS message to radio 121, which in turn delivers the data to remote location 125 to complete the transaction.

In a further example, the remote location 125 sends data to the CCL 100. The remote location 125 is associated with the TDMA radio 121 and the TDMA radio is served by MSC 117. The remote location 125 commands the TDMA radio 121 to originate an SMS message, which is received by the MSC 117 and transported to the SMA 104. The SMS message is transported to the SMA 104 through circuit 116, the SS7/IS41 network 106 and, the data circuit 105. The SMA 104 then searches the SMA database, using the MIN and the MSCID provided by the MSC 117, and determines: the CCL identifier; the class of service used by the CCL identified by the CCL identifier; and the wireless access method used by the MSC 117. The SMA 104 compares the class of service used by the CCL 100 and the wireless access method used by the MSC 117 to determine whether the data needs to be converted. If so, the SMA 104 converts the data.

The data is then delivered to the CCL 100 using the data circuit 103, the public voice/data transport 102 and the data circuit 101.

In yet a further example, the CCL 100 wishes to send data to the remote location 126. The remote location 126 is associated with a CDMA radio 122 and the CDMA radio is served by MSC 119. The CCL 100 sends the MIN of the CDMA radio 122 along with the data to be transported to the SMA 104. The SMA 104 determines from the SMA database 128 that the MIN corresponds to the CDMA radio 122; asynchronous digital data is the class of service; that the MSC 119 serves the CDMA radio 122; and that the method of transport from the SMA 104 to the MSC 119 is via data circuit 103 and public voice/data transport 102. Once this information is retrieved, a data message is sent from the SMA 104 to MSC 119. The message is sent through data circuit 103, public voice/data transport 102, and the data circuit 120. The data message is then sent by the MSC 119 to the CDMA radio 122, which in turn sends the data message to the remote location 126 to complete the transaction.

In a final example, the remote location 126 wishes to send data to the CCL 100. The remote location 126 is associated with a CDMA radio 122 and the CDMA radio is served by MSC 119. The remote location 126 requests that CDMA radio 122 initiate an asynchronous digital data call, which is received by the MSC 119 and transported to the SMA 104. The MSC 119 transports the data call via the data circuit 120, the public voice/data transport 102, and data circuit 103. The SMA 104 then searches the SMA database 128, using the MIN and the MSCID provided by the MSC 119, and determines: the CCL identifier for the intended recipient; the class of service used by the intended recipient; and the wireless access method used by the MSC 119. The SMA 104 compares the class of service used by the CCL 100 and the wireless access method used by the MSC 119 to determine whether the data needs to be converted. If so, the SMA 104 converts the data. The data is then delivered to the CCL 100 using the data circuit 103, the public voice/data transport 102 and the data circuit 101.

While a preferred embodiment has been set forth above, those skilled in the art who have reviewed the present disclosure will readily appreciate that other embodiments can be realized within the scope of the present invention. For example, transmission between the CCL 100 and the SMA 104 can take place through any suitable network, such as a TCP/IP Network. Also, any SMS protocol can be used. Therefore, the present invention should be construed as limited only by the present claims.

What is claimed is:

1. A system for interconnecting a plurality of data communication devices, the system comprising:
a first data communication path for receiving a transmission from a first data communication device;
an arbitrator operative to automatically:
determine, from the transmission, an identity of a second data communication device,
determine, from the identity of the second data communication device, a selected data format from a group of at least three data formats, the selected data format being expected by the second data communication device, and
convert the transmission into the selected data format determined from the identity of the second data communication device; and a second data communication path for transmitting the transmission converted by the arbitrator to the second data communication device.

2. The system of claim 1, wherein each of the plurality of data communication devices has an identifying characteristic, and wherein the arbitrator is further operative to:
   maintain a database that stores the identifying characteristics of each of the plurality of data communication devices;
   retrieve the identifying characteristic of the first data communication device from the transmission received; and
   search the database with the identifying characteristic of the first data communication device to determine the identity of the second data communication device.

3. The system of claim 2, wherein the database stores a data format expected by each of the plurality of data communication devices, and wherein the arbitrator is further operative to search the database using the identifying characteristic of the first data communication device to determine the data format expected by the second data communication device.

4. The system of claim 1, wherein each of the plurality of data communication devices has an identifying characteristic, and wherein the arbitrator is further operative to:
   maintain a database that stores the identifying characteristics of each of the plurality of data communication devices;
   retrieve the identifying characteristic of the second data communication device from the transmission received; and
   search the database with the identifying characteristic of the second data communication device.

5. The system of claim 4, wherein the database stores a method of transport to each of the plurality of data communication devices, and wherein the arbitrator is further operative to:
   search the database with the identifying characteristic of the second data communication device to determine the method of transport to the second data communication device; and
   transmit the transmission that is converted into the data format that is expected by the second communication device using the method of transport determined for the second data communication device.

6. The system of claim 1, wherein at least one of the first and second data communication devices is a wireless device, and wherein at least one of the first and second data communication paths is a data communication path for communicating with the wireless device.

7. The system of claim 1, wherein the first data communication device uses a first data format and the second data communication device uses a second data format which is incompatible with the first data format, and wherein the arbitrator is further operative to convert the transmission from the first data format to the second data format.

8. The system of claim 1, wherein the data format is selected from the group comprising time division multiple access, code division multiple access and global system for mobile telecommunications.

9. A system for managing communication among a plurality of data communication devices, the system comprising:
   a first data communication device for dispatching a first data transmission using a first wireless access method;
   a second data communication device for dispatching a second data transmission using a second wireless access method distinct from the first wireless access method;
   a third data communication device for receiving the second data transmission from the second data communication device; and
   an arbitrator for:
      receiving the first data transmission from the first data communication device,
      determining, from the first data transmission, an identity of the third data communication device to receive the first data transmission,
      determining a data format from at least three potential data formats, the data format being expected by the third data communication device for the first data transmission,
      converting the first data transmission to the data format expected by the third data communication device, and
      transmitting the converted first data transmission to the third data communication device.

10. The system of claim 9, wherein each of the plurality of data communication devices has an identifying characteristic, further comprising:
    a database for maintaining information regarding the plurality of data communication devices and the identifying characteristic of each of the plurality of data communication devices, whereby the arbitrator retrieves the identifying characteristic of the first data communication device from the first data transmission and searches the database with the identifying characteristic of the first data communication device to determine the identity of the third data communication device.

11. The system of claim 10, wherein the database stores the data format expected by each of the plurality of data communication devices and the arbitrator searches the database with the identifying characteristics of the first data communication device to determine the data format expected by the third data communication device.

12. The system of claim 10, wherein the arbitrator is further operative to compare the data format expected by the third data communication device with a data format used by the first data communication device.

13. The system of claim 10, wherein at least one of the first and second data communication devices is a wireless device.

14. The system of claim 9, wherein the arbitrator is further operable for,
    receiving the second data transmission from the second data communication device before it is transmitted to the third data communication device;
    determining a data format from at least three potential data formats, the data format being expected by the third data communication device for the data transmission;
    converting the second data transmission to the data format expected by the third data communication device; and
    transmitting the converted second data transmission to the third data communication device.

15. A method for communicating among a plurality of data communication devices associated with a plurality of wireless access methods comprising:
    receiving a converted first transmission from an arbitrator wherein the arbitrator created the converted first transmission from an original first transmission by, receiving the original first transmission from a first data communication device associated with a first wireless access method;

retrieving a mobile identification number (MIN) from the original first transmission;

using the MN to identify a second data communication device and a data format expected by the second data communication device; and converting the original first transmission so that it is compatible with the data format expected by the second data communication device.

16. The method of claim 15, wherein the arbitrator is further operable for storing the data format used by the second data communication device.

17. The method of claim 15, wherein the step of converting the original first transmission comprises converting the first wireless access method from one of the group consisting of time division multiple access, code division multiple access, and global system for mobile telecommunications.

18. The method of claim 15, further comprising the steps of retrieving a mobile switching center identification number (MSCID) for a mobile switch associated with the first data communication device from the original first transmission; and using the MSCID for converting the original first transmission so that it is compatible with the data format expected by the second data communication device.

19. A method for communicating between a first data communication device and a second data communication device comprising:

receiving a first transmission from the first data communication device associated with a first communication protocol;

retrieving a mobile identification number (MiN) from the first transmission;

using the MN to identify the second data communication device and a second communication protocol expected by the second data communication device;

converting the first communication protocol of the first transmission so that it is compatible with the second communication protocol; and transmitting the converted first transmission to the second data communication device.

20. The method of claim 19, further comprising the step of retrieving the second communication protocol from a storage device.

21. The method of claim 19, wherein the step of converting the first transmission comprises converting the first communication protocol from one of the group consisting of time division multiple access, code division multiple access, and global system for mobile communication.

22. The method of claim 19, further comprising the steps of retrieving a mobile switching center identification number (MSCID) for a mobile switch associated with the first data communication device from the first transmission; and using the MSCID for converting the first transmission so that it is compatible with the data format expected by the second data communication device.

23. A computer-readable storage device storing a set of computer-executable instructions implementing a method for communicating between a first data communication device and a second data communication device comprising:

receiving a first transmission from the first data communication device associated with a first communication protocol;

retrieving a mobile identification number (MIN) from the first transmission;

using the MN to identify the second data communication device and a second communication protocol expected by the second data communication device;

converting the first communication protocol of the first transmission so that it is compatible with the second communication protocol; and transmitting the converted first transmission to the second data communication device.

24. The computer-readable storage device of claim 23 storing a set of computer-executable instructions further comprising the step of retrieving the second communication protocol from a storage device.

25. The computer-readable storage device of claim 23 storing a set of computer-executable instructions wherein the step of converting the first transmission comprises converting the first communication protocol from one of the group consisting of time division multiple access, code division multiple access, and global system for mobile communication.

26. The computer-readable storage device of claim 23 storing a set of computer-executable instructions further comprising the steps of retrieving a mobile switching center identification number (MSCID) for a mobile switch associated with the first data communication device from the first transmission; and using the MSCID for converting the first transmission so that it is compatible with the data format expected by the second data communication device.

27. An arbitrator for interconnecting a plurality of data communication devices, the arbitrator comprising:

means for determining an identity of a receiving data communication device from a transmission received from a sending data communication device;

means for determining from the identity of the receiving data communication device, a selected data format from a group of at least three data formats, the selected data format being expected by the receiving data communication device; and means for converting the transmission into the selected data format determined from the identity of the receiving data communication device.

28. The arbitrator of claim 27, wherein the arbitrator further comprises:

means for maintaining a database that stores identifying characteristics of each of the plurality of data communication devices; and means for retrieving the selected data format being expected by the receiving data communication device using the identity of the receiving data communication device.

29. The arbitrator of claim 27, wherein the data format of the sending communication device is different from the data format of the receiving data communication device.

* * * * *

UNITED STATES PATENT AND TRADEMARK OFFICE
CERTIFICATE OF CORRECTION

PATENT NO. : 7,233,802 B2
APPLICATION NO. : 10/952710
DATED : June 19, 2007
INVENTOR(S) : Edward I. Comer and Jere Sandidge It is certified that error appears in the above-identified patent and that said Letters Patent is hereby corrected as shown below:

Column 11, line 6 "MN" should be -- MIN --
Column 11, line 35 "MiN" should be -- MIN --
Column 11, line 37 "MN" should be -- MIN --
Column 12, line 8 "MN" should be -- MIN --

Signed and Sealed this

Sixth Day of November, 2007

JON W. DUDAS
*Director of the United States Patent and Trademark Office*